United States Patent Office 3,233,986
Patented Feb. 8, 1966

3,233,986
SILOXANE-POLYOXYALKYLENE COPOLYMERS
AS ANTI-FOAM AGENTS
Edward L. Morehouse, Snyder, N.Y., assignor to Union
Carbide Corporation, a corporation of New York
No Drawing. Filed June 7, 1962, Ser. No. 200,619
11 Claims. (Cl. 44—76)

This invention relates to the use of certain organosilicon compounds to reduce the tendency of organic liquids to foam.

The foaming of organic liquids is a problem in many industrial applications. By way of illustration, the foaming of liquid organic fuels (e.g., gasoline and kerosene) may interfere with the pumping of the fuels, or may make it difficult to ascertain the true liquid level of the fuels or may obscure the faces of gauges used to measure the flow of the fuels. As a further illustration, the foaming of liquid organic solvents or diluents used as chemical reaction media (e.g., n-hexane) may interfere with refluxing or sparging operations involved in the chemical process. Consequently, the need exists to reduce the tendency of organic liquids to foam.

This invention is based on the discovery that the presence in an organic liquid of a small amount of an organosilicon copolymer that is insoluble in the organic liquid and that contains a siloxane moiety (or block) linked to a polyoxyalkylene moiety (or block) by a silicon to carbon bond reduces the tendency of the organic liquid to foam, provided that the polyoxyalkylene moiety is composed of a major amount of oxyethylene and/or oxypropylene groups. This invention provides compositions comprising an organic liquid which has a tendency to foam and a small amount of the above-mentioned organosilicon copolymer. This invention further provides a process for reducing the tendency of an organic liquid to foam which comprises adding to the liquid a small amount of the above-described organosilicon copolymer.

This invention is generally applicable to any organic liquid that has a tendency to foam. Organic liquids whose tendency to foam can be successfully reduced in accordance with the practice of this invention include the various hydrocarbon liquids. Hydrocarbon liquids whose tendency to foam is reduced in accordance with the present invention include the various liquid hydrocarbon fuels (e.g., kerosene, gasoline, diesel fuel and mixtures of such fuels with aromatic compounds such as biphenyl, toluene and/or methyl-substituted biphenyls). Also included are the various liquid hydrocarbon solvents (e.g., linear and cyclic aliphatic hydrocarbons, for example, n-hexane, heptane, octane and n-decane and cyclohexane as well as mineral oil and mixtures of such compounds with aromatic hydrocarbons) and particularly hydrocarbon solvents that are admixed with materials which increase the tendency of the solvent to foam (e.g., hydrocarbyl sulfates, and sulfonates and kerosene). Many of these hydrocarbon liquids as such can be characterized as being "non-lubricating" fluids (i.e., fluids which do not appreciably reduce the friction between rubbing metal surfaces, for example, rubbing steel surfaces). Moreover, such hydrocarbon liquids are often substantially anhydrous. These liquids can, however, contain the small amounts of water, such as, for example, the trace amounts of water that may be present in kerosene or gasoline and can contain materials which impart lubricating properties (e.g., hydrocarbyl sulfates and sulfonates). However, this invention is not necessarily limited to such hydrocarbons which are per se (i.e., in the absence of additives) non-lubricating or anhydrous.

The organic liquids whose tendency to foam can be successfully reduced in accordance with the practice of this invention can contain the additives customarily present in such liquids. Thus, the hydrocarbon fuels can contain additives such as tetraethyl lead and the hydrocarbon solvents can contain such additives as hydrocarbyl sulfonates and sulfates (e.g., when the solvent is the vehicle in a cutting oil). Hydrocarbyl sulfonates and sulfates that can be present in the organic liquids whose tendency to foam is reduced in accordance with the present invention include methyl sulfonate, butyl sulfonate, phenyl sulfonate and tolyl sulfonate and dimethyl sulfate, dibutyl sulfate, diphenyl sulfate and ditolyl sulfate, as well as mixtures of sulfates or sulfonates produced by the sulfation or sulfonation of xylene, petroleum fractions or mineral oil. Alkali metal salts of such sulfates and sulfonates (e.g., sodium dodecylbenzene sulfonate and sodium dilauryl sulfate) can be present in such solvents.

The copolymers that are useful in the compositions of this invention are of the class that are known as "block" copolymers. Block copolymers are composed of at least two sections or blocks, at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention). Block copolymers can have linear, cyclic or branched (crosslinked) structures.

It is essential that the polyoxyalkylene block in the copolymers that are useful in the compositions of this invention be composed of a major amount of oxyethylene and/or oxypropylene groups. Thus, at least 60 percent by weight of the oxyalkylene groups must be oxyethylene or oxypropylene groups. Preferably, the polyoxyalkylene block is composed solely of oxyethylene or oxypropylene groups.

The siloxane blocks in the copolymers employed in the compositions of this invention contain at least two siloxane groups that are represented by the formula:

$$R_bSiO_{\frac{4-b}{2}} \quad (1)$$

wherein R is a monovalent hydrocarbon group or a divalent hydrocarbon group and $b$ has a value from 1 to 3 inclusive. Preferably, R contains from one to about thirty carbon atoms. The groups represented by R can be the same or different in any given siloxane group or throughout the siloxane block, and the value of $b$ in the various siloxane groups in the siloxane block can be the same or different. The divalent hydrocarbon groups represented by R link the siloxane block to the oxyalkylene block. Each siloxane block contains at least one group represented by Formula 1 wherein at least one group represented by R is a divalent hydrocarbon group. The siloxane block has a ratio of hydrocarbon groups to silicon atoms from 1:1 to 3:1.

Illustrative of the monovalent hydrocarbon groups that are represented by R in Formula 1 are the alkenyl groups (for example, the vinyl and the allyl group); the cycloalkenyl groups (for example, the cyclohexenyl group); the alkyl groups (for example, the methyl, ethyl, isopropyl, octyl and dodecyl groups); the aryl groups (for example, the phenyl and naphthyl groups); the aralkyl groups (for example, the benzyl and the phenylethyl groups); the alkaryl groups (for example, the styryl, tolyl and n-hexylphenyl groups), and the cycloalkyl groups (for example, the cyclohexyl group).

Illustrative of the divalent hydrocarbon groups represented by R in Formula 1 are the alkylene groups (such as the methylene, ethylene, propylene, butylene, 2,2-dimethyl-1,3-propylene and decylene groups), the arylene groups (such as the phenylene and p,p'-diphenylene groups), and the alkarylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulae:

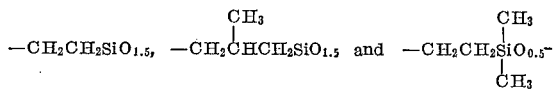

These divalent hydrocarbon groups are linked to a silicon atom of the siloxane block by a silicon-to-carbon bond and to an oxygen atom of the oxyalkylene block by a carbon-to-oxygen bond.

The siloxane block in the copolymers useful in the compositions of this invention can contain siloxane groups that are represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups).

The siloxane block in the copolymers useful in the compositions of this invention can contain one or more types of siloxane groups that are represented by Formula 1 provided that at least one group has at least one divalent hydrocarbon substituent. By way of illustration, only ethylenemethylsiloxy groups

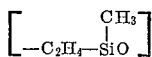

can be present in the siloxane block or the siloxane block can contain more than one type of siloxane group, e.g., the block can contain both ethylenemethylsiloxy groups and diphenylsiloxy groups, or the block can contain ethylenemethylsiloxy groups, diphenylsiloxy groups and diethylsiloxy groups.

The siloxane block contained in the copolymers useful in the compositions of this invention can contain trifunctional siloxane groups (e.g., monomethylsiloxane groups, $CH_3SiO_{1.5}$), difunctional siloxane groups (e.g., dimethylsiloxane groups, $(CH_3)_2SiO$—), monofunctional siloxane groups (e.g., trimethylsiloxane groups, $$(CH_3SiO_{0.5})$$

or combinations of these types of siloxane groups having the same or different substituents. Due to the functionality of the siloxane groups, the siloxane block can be predominantly linear or cyclic or crosslinked or it can have combinations of these structures.

The siloxane block contained in the copolymers useful in the compositions of this invention can contain organic end-blocking or chain terminating organic groups, in addition to the monofunctional siloxane chain terminating groups encompassed by Formula 1. By way of illustration, the siloxane block can contain such organic end-blocking groups as the hydroxyl group, the aryloxy groups (such as the phenoxy group), the alkoxy groups (such as the methoxy, ethoxy, propoxy and butoxy groups), the acyloxy groups (such as the acetoxy group), and the like.

The siloxane blocks in the copolymers useful in the compositions of this invention contain at least two siloxane groups that are represented by Formula 1. Preferably, the siloxane blocks contain a total of from five to twenty siloxane groups that are represented by Formula 1. That part of the average molecular weight of the copolymer that is attributable to the siloxane blocks can be as high as 50,000 but preferably it is from 220 to 20,000. If that part of the average molecular weight of the copolymer that is attributable to the siloxane blocks exceeds 50,000 or if the siloxane blocks contain a total of more than twenty siloxane groups that are represented by Formula 1, the copolymers are usually not as useful, e.g., they may be too viscous for convenient use in the formulations of this invention.

A siloxane block can contain, in addition to the groups represented by Formula 1, siloxane groups represented by the formula:

 (1-a)

wherein R has the meaning defined in Formula 1, $e$ has a value from 0 to 2, $f$ has a value from 1 to 2 and $(e+f)$ has a value from 1 to 3, inclusive.

The oxyalkylene blocks in the copolymers employed in the compositions of this invention each contain at least two oxyalkylene groups that are represented by the formula:

$$[\text{—R'O—}] \quad (2)$$

wherein R' is an alkylene group. At least 60 percent by weight of such groups represented by Formula 2 must be oxyethylene or oxypropylene groups. Illustrative of other oxyalkylene groups that are represented by Formula 2 which can also be present in the oxyalkylene block in amounts not exceeding 40 percent by weight are the oxy-1,4-butylene, oxy-1,5-amylene, oxy-2,2-dimethyl-1,3-propylene, oxy-1,10-decylene groups and the like.

The oxyalkylene blocks in the copolymers useful in the compositions of this invention can contain oxyethylene or oxypropylene groups alone or along with one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene blocks in the copolymers employed in the compositions of this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also, a single group can serve as an end-blocking group for more than one oxyalkylene block. For example, the glyceroxy group,

can serve as an end-blocking group for three oxyalkylene chains.

The oxyalkylene blocks in the copolymers useful in the compositions of this invention each contain at least two oxyalkylene groups that are represented by Formula 2. Preferably, each block contains from four to thirty of such groups. That part of the average molecular weight of the copolymer that is attributable to the oxyalkylene blocks can vary from 176 [for $(C_2H_4O)_4$] to 200,000, but preferably it is from 176 to 15,000. Provided that each oxyalkylene block contains at least two oxyalkylene groups represented by Formula 2, the number of oxyalkylene groups and that part of the average molecular weight of the copolymer that is attributable to the oxyalkylene blocks is not critical, but those copolymers in which that part of the average molecular weight that is attributable to the oxyalkylene blocks exceeds 200,000 or that contain more than fifty oxyalkylene groups per block are less useful, e.g., they are too viscous for convenient use in the formulations of this invention.

The copolymers useful in the compositions of this invention can contain siloxane blocks and oxyalkylene blocks in any relative amount. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 50 parts by weight of the siloxane blocks and from 50 parts by weight to 95 parts by weight of the oxyalkylene blocks per 100 parts by weight of the copolymer.

The copolymers useful in the compositions of this invention can contain more than one of each of the blocks and the blocks can be arranged in various configurations such as linear, cyclic or branched configurations. By way of illustration, the following classes of compounds are among the siloxane-oxyalkylene block copolymers useful in the formulations of this invention.

(A) Copolymers that contain at least one unit that is represented by the formula:

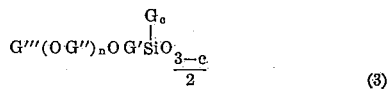

(B) Copolymers that contain at least one unit that is represented by the formula:

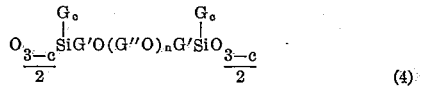

(C) Copolymers that contain at least one unit that is represented by the formula:

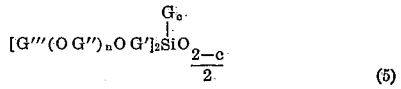

In the above Formulas 3, 4 and 5, G is a monovalent hydrocarbon radical, G' is a divalent hydrocarbon radical, G" is an alkylene radical containing at least two carbon atoms, G''' is a hydrogen atom or a monovalent hydrocarbon radical free of aliphatic unsaturation and $n$ has a value of at least two and $c$ has a value from 0 to 2 in Formulas 3 and 4 and a value from 0 to 1 in Formula 5. In Formulas 3, 4 and 5, G can represent the same or different radicals, $n$ preferably has a value from 4 to 30 inclusive and G" can represent the same or different radicals, i.e., the group $(OG'')_n$ can represent, for example, the groups:

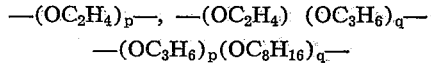

where $p$ and $q$ are integers having a value of at least one.

The monovalent hydrocarbon radicals represented by G in Formulas 3, 4 and 5 can be saturated or olefinically unsaturated or can contain benzenoid unsaturation. Illustrative of the monovalent hydrocarbon radicals represented by G are the linear aliphatic radicals (e.g., the methyl, ethyl and decyl radicals), the cycloaliphatic radicals (e.g., the cyclohexyl and the cyclopentyl radicals), the aryl radicals (e.g. the phenyl, totyl, xylyl and naphthyl radicals), the aralkyl radicals (e.g., the benzyl and beta-phenylethyl radicals), the unsaturated linear aliphatic radicals (e.g., the cyclohexenyl radical).

Preferably, the G and G' groups [included in the definition of R in Formulas 1 and 1–$a$ above] contain from one to about twelve carbon atoms and the G" groups [included in the definition of R' in Formula 2 above] contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 3, 4 and 5 are the alkylene radicals (e.g., the methylene, ethylene, 1,3-propylene, 1,4-butylene and 1,12-dodecylene radicals), the arylene radicals (e.g., the phenylene radical) and the alkarylene radicals (e.g., the phenylethylene radicals). In Formulas 3, 4 and 5, G' is preferably an alkylene radical containing at least two carbon atoms.

Illustrative of the alkylene radicals containing at least two carbon atoms represented by G" in Formulas 3, 4 and 5 are the ethylene, 1,3-propylene, 1,3-propylene, 1,6-hexylene, 2-ethylhexylene-1,6 and 1,12-dodecylene radicals.

Illustrative of the radicals represented by G''' in Formulas 3, 4 and 5 are the saturated linear or branched chain aliphatic hydrocarbon radicals (e.g., the methyl, ethyl, propyl, n-butyl, tert-butyl and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and beta-phenylethyl radicals).

The following are representative of the hydrolytically stable siloxane-oxyalkylene block copolymers useful in the compositions of this invention. In the formulas, Me represents methyl ($CH_3$—), Et represents ethyl ($CH_3CH_2$—), $\phi$ represents phenyl ($C_6H_5$—), and $x$ is an integer. Where the formula represents a unit of a polymer, it is understood that the polymer is terminated by end-blocking groups of the type described hereinabove. In the formula Bu represents butyl ($C_4H_9$—).

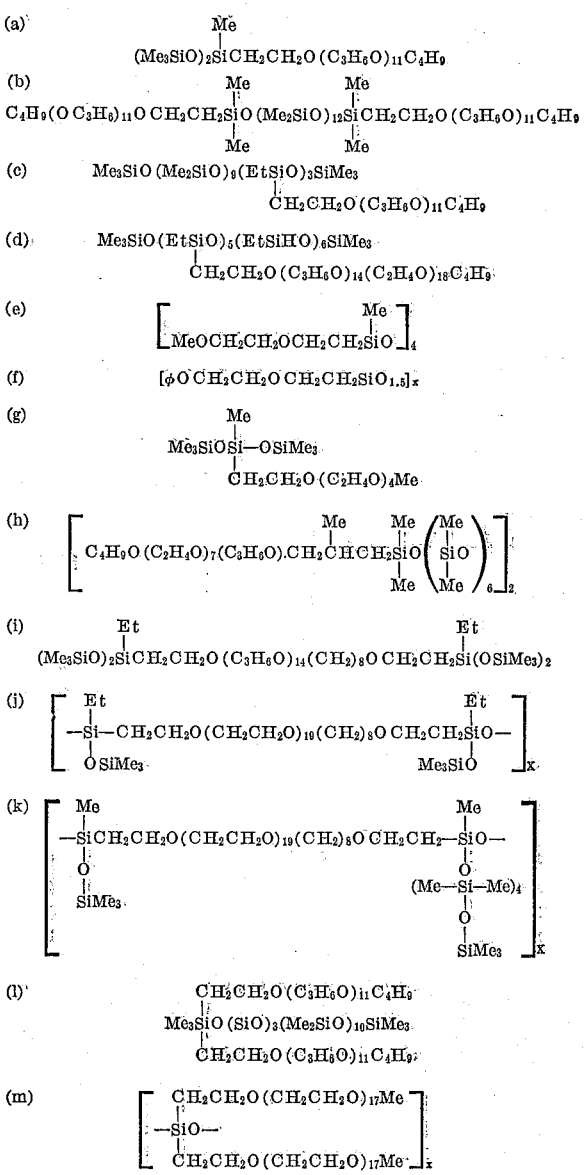

(n)
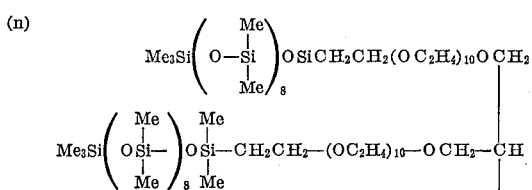

(o)
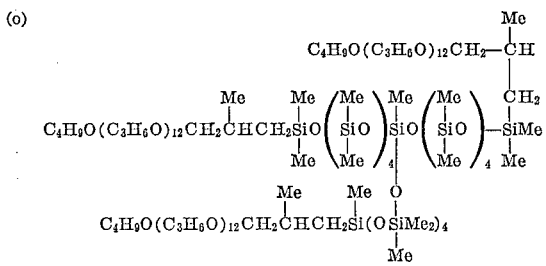

(p) $Me_3SiO(Me_2SiO)_{8.5}$
$[Me(OC_2H_4)_{16}OC_3H_6SiMeO]_{3.5}SiMe_3$

The latter copolymer is referred to hereinafter as "Copolymer I."

(q) $Me_3SiO(Me_2SiO)_{5.1}$
$[Me(OC_2H_4)_{7.2}OC_3H_6SiMeO]_{7.5}SiMe_3$

The latter copolymer is referred to hereinafter as "Copolymer II."

(r) $Me_3SiO(Me_2SiO)_{21}[Bu(OC_2H_4)_{18}$
$(OC_3H_6)_{14}OC_3H_6SiMeO]_{3.5}SiMe_3$

The latter copolymer is referred to hereinafter as "Copolymer III."

(s) $Me_3SiO(Me_2SiO)_{8.5}$
$[Bu(OC_3H_6)_{12.5}OC_3H_6SiMeO]_{3.5}SiMe_3$

The latter copolymer is referred to hereinafter as "Copolymer IV."

(t) $Me_3SiO(Me_2SiO)_{21}$
$[Me(OC_2H_4)_{7.2}OC_3H_6SiMeO]_{3.5}SiMe_3$

The latter copolymer is referred to hereinafter as "Copolymer V."

(u) $Me_3SiO(Me_2SiO)_{8.5}$
$[Me(OC_2H_4)_{25}OC_3H_6SiMeO]_{3.5}SiMe_3$

The latter copolymer is referred to hereinafter as "Copolymer VI."

(v)

(W)

(x)

The above-described block copolymers can be produced by an addition reaction between siloxanes containing silicon-bonded hydrogen atoms and oxyalkylene polymers containing alkenyl end-blocking groups in the presence of a platinum catalyst. These copolymers can also be prepared by a metathesis reaction between siloxanes containing silicon-bonded chloro-organo groups and an alkaline metal salt of a hydroxy end-blocked oxyalkylene polymer. Alkyline metal chlorides are produced as by-products in the latter-mentioned reaction.

The above-described block copolymers can be added to a liquid whose tendency to foam is to be reduced either as such or in the form of a solution. Suitable solutions are composed of the copolymers dissolved in an ether (e.g., the dimethyl ether of ethylene glycol) or in an alcohol (e.g., ethanol). From 0.1 to 5 parts by weight of the copolymer per 100 parts by weight of the solvent can be advantageously employed. The copolymers can also be added in the form of an emulsion. Solid copolymers can be added in the solid state or in the molten state.

Many of the copolymers that are useful in the compositions of this invention are self-dispersing and distribute themselves uniformly throughout the organic liquid without mechanical dispersing means being employed. However, such means (e.g., dispersators, colloid mills, magnetic stirrers, propeller stirrers and the like) can be employed if desired.

The relative amount of the above-described organosilicon copolymers present in the compositions of this invention is not critical and can range from 5 to 2000 parts by weight of the copolymers per million parts by weight of the organic liquid. Particularly good results are often obtained when the composition contains from 100 to 500 parts by weight of the copolymer per million parts by weight of the organic liquid. Although other relative amounts of the copolymers can be used, no commensurate advantage is gained thereby.

The presence of the above-described copolymers in the compositions of this invention reduces the tendency of the organic liquid to foam and does not impair the other useful properties of the liquid. Thus, fuels and solvents can, after the addition of such copolymers, function in their intended area of application. For example, kerosene containing such copolymers can be used as a fuel in lamps, stoves or jet engines.

The following examples illustrate the present invention:

Example 1

In each of the following tests a solution was first prepared containing 1 part by weight of Copolymer I dissolved in 100 parts by weight of the dimethyl ether of ethylene glycol. A portion of this solution was then added to organic liquids in order to reduce the tendency of the organic liquids to foam. In each test 200 parts by weight of Copolymer I per million parts by weight of the organic liquid was added to the organic liquid. The copolymer-containing liquids (5 cubic centimeters) were then agitated vigorously and the following rating system was used:

A denotes excellent results, i.e. very little foaming compared to the same liquid without the copolymer.
B denotes good results.
C denotes fair results.
D denotes poor results but some improvement over the copolymer-free liquid.
E denotes no decrease in foaming.

The following results were obtained:

| Test | Organic Liquid (Volume percent) | Rating |
|---|---|---|
| 1 | 5% biphenyl solution (1)<br>95% kerosene | A |
| 2 | 10% biphenyl solution (1)<br>90% kerosene | A |
| 3 | 10% biphenyl solution (1)<br>5% toluene<br>85% kerosene | A |
| 4 | 10% biphenyl solution (1)<br>10% toluene<br>80% kerosene | A |
| 5 | 20% xylene mixture (2)<br>80% kerosene | B |
| 6 | 20% n-decane<br>80% kerosene | A |
| 7 | 20% cyclohexane<br>80% kerosene | A |

(1) A solution composed of:

| | Percent By weight |
|---|---|
| 1,2-biphenylethane | 5.4 |
| Ethyl biphenyl | 3.0 |
| Methyl biphenyl (mixtures of all four isomers) | 36.2 |

| | |
|---|---|
| Biphenyl | 54.7 |
| Methyl naphthalene | 0.5 |
| Indan | 0.1 |
| Indene | 0.1 |
| | 100.0 |

(2) Composed mostly of xylenes and some naphthalene and aliphatic compounds; boiling range 132–153° C.; flash point (closed cup) 81° F.; speed of evaporation 14 minutes; kauri butanol value 80; aniline point −2° F.; specific gravity at 60° F. is 0.8418; aromatic equivalent content 76%; sold under the tradename "S C Solvent #2" by the Central Solvents and Chemicals Company.

Good results are also achieved when Copolymers II, III, IV or V are used in lieu of Copolymer I in the above tests.

*Example II*

Copolymer VI was added to 35 cubic centimeters of kerosene (1500 parts by weight of the copolymer per million parts by weight of the kerosene) and the mixture so formed was shaken. The tendency of the copolymer to foam was observed to have been decreased by the addition of the copolymer.

*Example III*

In each of two tests an organosilicon copolymer of the above-described type was added to 200 cubic centimeters of kerosene that was in a one-liter graduated flask. The concentration of organosilicon copolymer was 100 parts by weight per million parts by weight of the kerosene. Dry nitrogen was passed into the mixture and a rate of one liter per minute through a fritted glass dish at the bottom of the graduate and the volume of the liquid and foam mixture produced by the gas was measured periodically. The following results were obtained:

| Run | Copolymer | Volume of Liquid and Foam (Cubic Centimeters) | | | |
|---|---|---|---|---|---|
| | | 0.5 (min.) | 1 (min.) | 5 (min.) | 10 (min.) |
| 1 | None | 260 | 270 | 280 | 290 |
| 2 | Copolymer I [1] | 220 | 220 | 220 | 230 |
| 3 | Copolymer III [2] | 240 | 250 | 270 | 270 |

[1] In the form of a solution composed of one part by weight of the copolymer dissolved in 100 parts by weight of ethylene glycol dimethyl ether.
[2] In the form of a solution composed of one part by weight of the copolymer dissolved in 100 parts by weight of ethylene glycol dimethyl ether.

What is claimed is:

1. An anhydrous hydrocarbon composition comprising (A) a non-lubricating, liquid hydrocarbon having a tendency to foam and (B) from 5 parts to 2000 parts by weight per million parts by weight of said liquid of a copolymer that is insoluble in said liquid and that consists essentially of (1) at least one siloxane block comprising at least two siloxane groups that are represented by the formula:

$$R_b SiO_{\frac{4-b}{2}}$$

wherein R is a member selected from the group consisting of the monovalent hydrocarbon groups and the divalent hydrocarbon groups and $b$ has a value from 1 to 3 inclusive, said siloxane block having at least one divalent hydrocarbon group represented by R, and (2) at least one polyoxyalkylene block comprising at least two oxyalkylene groups that are represented by the formula:

$$[-R'O-]$$

wherein R' is an alkylene group, each such siloxane block being linked to each such polyoxyalkylene block by a divalent hydrocarbon group represented by R, at least 60 percent by weight of said —R'O— groups having from 2 to 3 carbon atoms inclusive.

2. The composition of claim 1 wherein R' is an ethylene group.

3. The composition of claim 1 wherein the copolymer is selected from the group consisting of:

(a) a copolymer comprising groups represented by the formula:

$$G'''(OG'')_n OG'\underset{|}{\overset{G_c}{Si}}O_{\frac{3-c}{2}} \quad (I)$$

wherein G''' is a member selected from the group consisting of the hydrogen atom and the monovalent hydrocarbon groups, G'' is an alkylene radical containing at least two carbon atoms, G' is a divalent hydrocarbon radical, G is a monovalent hydrocarbon radical, n has a value of at least two and c has a value from 0 to 2 inclusive;

(b) a copolymer comprising groups represented by the formula:

$$O_{\frac{3-c}{2}}\underset{|}{\overset{G_c}{Si}}G'O(G''O)_n G'\underset{|}{\overset{G_c}{Si}}O_{\frac{3-c}{2}} \quad (II)$$

wherein G, G', G'', n and c has the above-defined meanings; and (c) a copolymer comprising groups represented by the formula:

$$[G'''(OG'')_n OG']_2 \underset{|}{\overset{G_c}{Si}}O_{\frac{2-c}{2}} \quad (III)$$

wherein G''', G'', G', G and n have the above-defined meanings and c has a value from 0 to 1, inclusive, at least 60 percent by weight of said OG'' groups in Formulae I, II and III having from 2 to 3 carbon atoms inclusive.

4. The composition of claim 3, wherein the copolymer consists essentially of both (1) at least one group selected from the group consisting of the groups represented by Formulae I, II and III of claim 3 and (2) groups having the formula:

$$R_b SiO_{\frac{4-b}{2}}$$

wherein R is a monovalent hydrocarbon group, and $b$ has a value from 1 to 3 inclusive.

5. The composition of claim 1, wherein the liquid is kerosene.

6. The composition of claim 1, wherein the liquid is gasoline.

7. The composition of claim 1, wherein the copolymer has the formula:

Me₃SiO(Me₂SiO)₈.₅[Me(OC₂H₄)₁₆OC₃H₆SiMeO]₃.₅SiMe₃

8. The composition of claim 1, wherein the copolymer has the formula:

Me₃SiO(Me₂SiO)₅.₁[Me(OC₂H₄)₇.₂OC₃H₆SiMeO]₇.₅SiMe₃

9. The composition of claim 1, wherein the copolymer has the formula:

Me₃SiO(Me₂SiO)₂₁[Bu(OC₂H₄)₁₈(OC₃H₆)₁₄OC₃H₆SiMeO]₃.₅SiMe₃

10. The composition of claim 1, wherein the copolymer has the formula:

Me₃SiO(Me₂SiO)₈.₅[Bu(OC₃H₆)₁₂.₅OC₃H₆SiMeO]₃.₅SiMe₃

11. The composition of claim 1, wherein the copolymer has the formula:

$Me_3SiO(Me_2SiO)_{21}$
$[Me(OC_2H_4)_{7.2}OC_3H_6SiMeO]_{3.5}SiMe_3$

References Cited by the Examiner

UNITED STATES PATENTS

| | | | |
|---|---|---|---|
| 2,846,458 | 8/1958 | Haluska | 260—46.5 |
| 2,868,824 | 1/1959 | Haluska | 260—448.2 |
| 2,917,480 | 12/1959 | Bailey et al. | 252—49.6 |
| 2,992,083 | 7/1961 | Bluestein et al. | 44—76 |
| 3,057,901 | 10/1962 | Plueddemann | 252—49.6 |

DANIEL E. WYMAN, *Primary Examiner.*
JULIUS GREENWALD, *Examiner.*